United States Patent
Goto et al.

(10) Patent No.: US 8,050,703 B2
(45) Date of Patent: Nov. 1, 2011

(54) MOBILE COMMUNICATION METHOD, MOBILE COMMUNICATION SYSTEM, AND RADIO BASE STATION

(75) Inventors: Yoshikazu Goto, Yokohama (JP); Akihito Hanaki, Yokohama (JP); Takahiro Hayashi, Yokosuka (JP); Junichiro Kawamoto, Tokyo (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 494 days.

(21) Appl. No.: 12/360,891

(22) Filed: Jan. 28, 2009

(65) Prior Publication Data

US 2009/0196246 A1    Aug. 6, 2009

(30) Foreign Application Priority Data

Feb. 1, 2008    (JP) ................ P2008-023317

(51) Int. Cl.
*H04W 52/28* (2009.01)
(52) U.S. Cl. ........................................ 455/522
(58) Field of Classification Search .............. 370/311; 455/522
See application file for complete search history.

(56) References Cited

U.S. PATENT DOCUMENTS

| | | | |
|---|---|---|---|
| 2004/0001472 A1 | 1/2004 | Kwak et al. | |
| 2008/0186862 A1* | 8/2008 | Corbett et al. | 370/237 |
| 2008/0310385 A1* | 12/2008 | Iochi et al. | 370/345 |
| 2010/0002596 A1* | 1/2010 | Wu | 370/252 |
| 2010/0075693 A1* | 3/2010 | Kishigami et al. | 455/452.2 |
| 2011/0044263 A1* | 2/2011 | El-saidny | 370/329 |

FOREIGN PATENT DOCUMENTS

| | | |
|---|---|---|
| EP | 1513272 A1 | 3/2005 |
| JP | 2006-115357 A | 4/2006 |

OTHER PUBLICATIONS

3GPP TS 25.211 V7.4.0 (Nov. 2007), 3rd Generation Partnership Project; Technical Specification Group Radio Access Network; Physical channels and mapping of transport channels onto physical channels (FDD) (Release 7), 54 pages.

* cited by examiner

*Primary Examiner* — Melvin Marcelo
(74) *Attorney, Agent, or Firm* — Marvin A. Motsenbocker; Mots Law, PLLC

(57) ABSTRACT

A mobile communication method according to the present invention includes: notifying, from a MAC-e functional unit 10, to a first mobile station UE through a first E-AGCH, a transmission rate for the EUL in the first mobile station UE, in a 2 ms interval; notifying, from the MAC-e functional unit 10, to a second mobile station UE through a second E-AGCH, a transmission rate for the EUL in the second mobile station UE, in a 10 ms interval; notifying, from the MAC-e functional unit 10 to a MAC-hs functional unit 20, the number of the first E-AGCH and the number of the second E-AGCH, in each sub-frames; and determining, at the MAC-hs functional unit 20, a transmission power for a HS-PDSCH, based on the respective numbers of the first E-AGCH and the second E-AGCH.

5 Claims, 6 Drawing Sheets

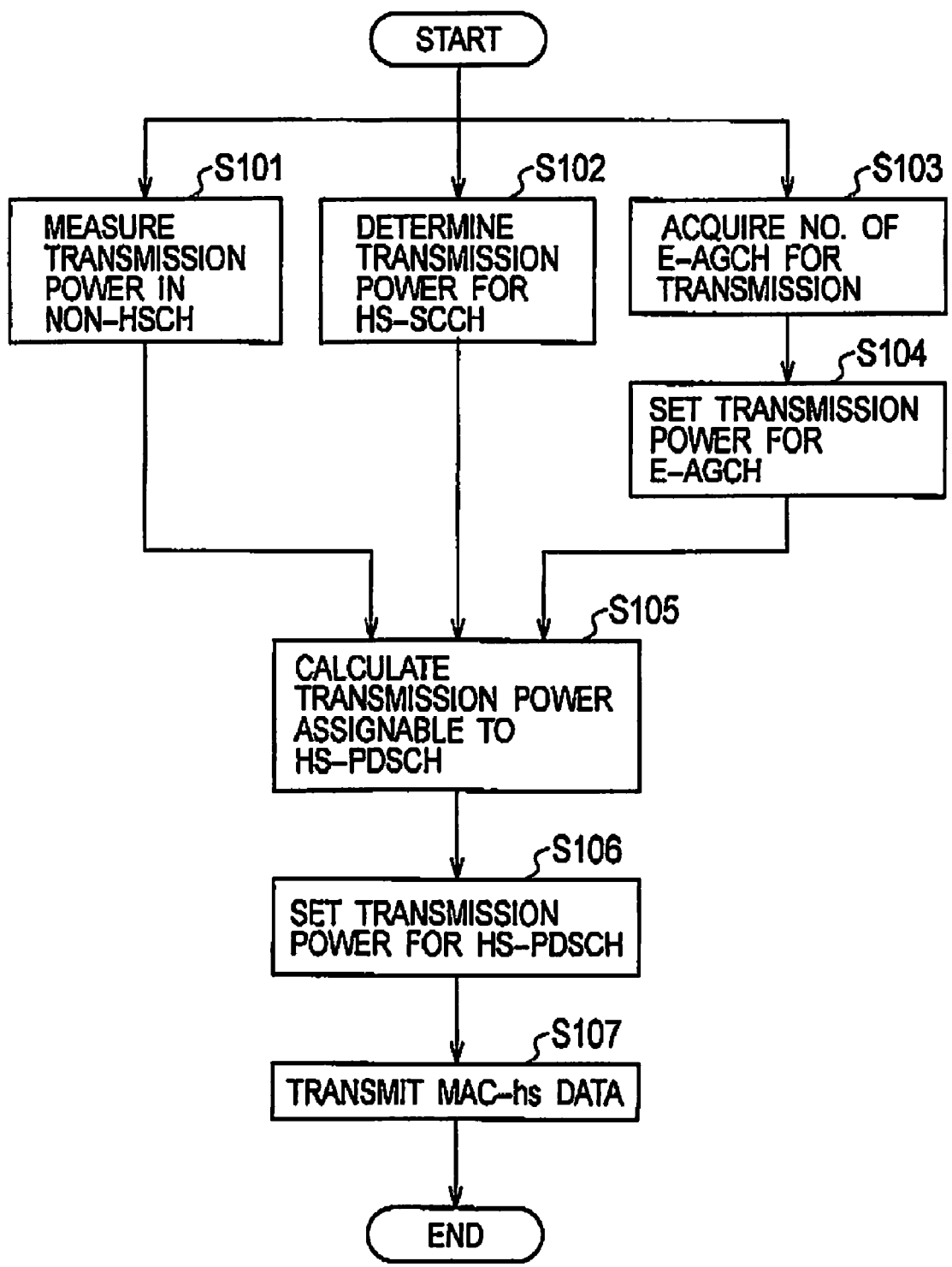

MOBILE COMMUNICATION METHOD, MOBILE COMMUNICATION SYSTEM, AND RADIO BASE STATION

CROSS REFERENCE TO RELATED APPLICATION

This application is based upon and claims the benefit of priority from prior Japanese Patent Application No. 2008-023317, filed on Feb. 1, 2008; the entire contents of which are incorporated herein by reference.

BACKGROUND OF THE INVENTION

1. Field of the Invention

The present invention relates to a mobile communication method, a mobile communication system, and a radio base station, in which a high speed uplink packet communication and a high speed downlink packet communication are performed between the radio base station and a mobile station.

2. Description of the Related Art

In a mobile communication system as shown in FIG. 1, an enhanced uplink (EUL)/a high speed uplink packet access (HSUPA) defined by the 3GPP is adopted as a high speed uplink packet communication, while a high speed downlink packet access (HSDPA) defined by the 3GPP is adopted as a high speed downlink packet communication.

In such a mobile communication system, an E-DCH absolute grant channel (E-AGCH), an E-DCH relative grant channel (E-RGCH), and an E-DCH hybrid ARQ indicator channel (E-HICH) are established as downlink channels (EUL control channels) from a radio base station NodeB to a mobile station UE.

In addition, in the mobile communication system, a high speed physical downlink shared channel (HS-PDSCH) and a shared control channel for HS-DSCH (HS-SCCH) are established as downlink channels (HS channels) from the radio base station NodeB to the mobile station UE.

Furthermore, in this mobile communication system, a dedicated physical channel (DPCH), a common pilot channel (PCPICH), and a common control physical channel (PCCPCH) are established as downlink channels (non-HS channels) from the radio base station Node B to the mobile station UE.

With reference to FIG. 2, description will be given for an example of a method that determines a transmission power for the HS-PDSCH, in the mobile communication system applying the HSDPA.

Firstly, a MAC-hs functional unit of a radio base station NodeB calculates a power variation margin $P_{margin}$ in each sub-frame (TTI: Transmission Time Interval), by use of the following equation 2:

$$P_{margin}=(\alpha-1)\times(P_{nonHS}-P_{PCPICH}-P_{PCCPCH}) \quad \text{(Equation 1)},$$

where $\alpha$ is a margin coefficient for a dedicated channel, $P_{nonHS}$ is a measured value of a total transmission power in the non-HS channel, $P_{PCPICH}$ is a measured value of a transmission power in the PCPICH, and $P_{PCCPCH}$ is a measured value of a transmission power in the PCCPCH.

Secondly, the MAC-hs functional unit of the radio base station NodeB calculates the transmission power $P_{HSPDSCH}$ in the HS-PDSCH in each sub-frame (TTI), by use of the following equation 2:

$$P_{HSPDSCH}=P_{total}-P_{nonHS}-P_{margin}-N_{HSSCCH}\times P_{HSSCCH} \quad \text{(Equation 2)},$$

where $P_{total}$ is an upper limit of the transmission power that can be assigned to a downlink channel, $N_{HSSCCH}$ is the number of the set HS-SCCHs, $P_{HSSCCH}$ is the transmission power in each HS-SCCH.

On the other hand, in a mobile communication system in which both EUL and HSDPA are applied, EUL control channels (specifically, E-AGCH, E-RGCH, and E-HICH) are additionally established as downlink channels, in addition to the channels shown in FIG. 2.

These EUL control channels do not always transmit information. Instead, the information is transmitted when receiving an instruction from a MAC-e functional unit (EUL functional unit) of the radio base station NodeB.

Here, two possible methods will be shown as the methods for determining, at the MAC-hs functional unit of the radio base station NodeB, the transmission power $P_{HSPDSCH}$ in the HS-PDSCH, in consideration of the transmission power in the EUL control channels.

A first method is that the MAC-hs functional unit determines the transmission power $P_{HSPDSCH}$ in the HS-PDSCH in each sub-frame (TTI) always after surely reserving the transmission power required for transmitting the information through the EUL control channels.

Specifically, the MAC-hs functional unit calculates the transmission power $P_{HSPDSCH}$ in the HS-PDSCH in each sub-frame (TTI), by use of the following equation 3:

$$P_{HSPDSCH}=P_{total}-P_{nonHS}-P_{margin}-N_{HSSCCH}\times P_{HSSCCH}-P_{E\text{-}AGCH}\text{ (fixed)}-P_{E\text{-}RGCH}\text{ (fixed)}-P_{E\text{-}HICH}\text{ (fixed)} \quad \text{(Equation 3)},$$

where $P_{E\text{-}AGCH}$ (fixed) is the transmission power (fixed value) required for transmitting the information through the E-AGCH, $P_{E\text{-}RGCH}$ (fixed) is the transmission power (fixed value) required for transmitting the information through the E-RGCH, and $P_{E\text{-}HICH}$ (fixed) is the transmission power (fixed value) required for transmitting the information through the E-HICH.

However, in this method, the transmission power for transmitting the information through the EUL control channels is always reserved even though the information is not always transmitted on the EUL control channels. This reserved radio resources are wasted, thereby causes a problem of reducing the transmission power that can be assigned to the HS-PDSCH as the transmission power $P_{HSPDSCH}$.

Meanwhile, a second method is that the MAC-hs functional unit measures the transmission power in the EUL control channels, and thereafter determines the transmission power $P_{HSPDSCH}$ in the HS-PDSCH in each sub-frame (TTI).

Specifically, the MAChs functional unit calculates the transmission power $P_{HSPDSCH}$ in the HS-PDSCH in each sub-frame (TTI), by use of the following equation 4:

$$P_{HSPDSCH}=P_{total}-P_{nonHS}-P_{margin}-N_{HSSCCH}\times P_{HSSCCH} \quad \text{(Equation 4)},$$

where $P_{nonHS}$ includes measured values of the transmission power in the E-AGCH, the E-RGCH, and the E-HICH.

However, in this method, the measurement results may largely differ from the transmission power actually used (actual transmission power), due to a delay in reflecting the measurement results and an averaging of measured times for the transmission power in the EUL control channels. Accordingly, $P_{margin}$ has to be set large to some extent, and this also causes a problem of reducing the transmission power that can be assigned to the HS-PDSCH as transmission power $P_{HSPDSCH}$.

In particular, since the E-AGCH requires a large transmission power, it is difficult to adjust the measurement results for the transmission power in the E-AGCH, to the actual transmission power, in accordance with the change in the number of the set E-AGCHs, that is changed from moment to moment.

SUMMARY OF THE INVENTION

A first aspect of the present invention is summarized as a mobile communication method in which a high speed uplink packet communication and a high speed downlink packet communication are performed between a radio base station and a mobile station, including: notifying, from a high speed uplink packet communication control functional unit to a first mobile station through a first transmission rate assignment channel for the high speed uplink packet communication, a transmission rate for the high speed uplink packet communication in the first mobile station, in a first transmission time period; notifying, from the high speed uplink packet communication control functional unit to a second mobile station through a second transmission rate assignment channel for the high speed uplink packet communication, a transmission rate for the high speed uplink packet communication in the second mobile station, in a second transmission time period; notifying, from the high speed uplink packet communication control functional unit to a high speed downlink packet communication control functional unit, the number of the first transmission rate assignment channels through which the transmission rate is notified to the first mobile station, in the first transmission time period; notifying, from the high speed uplink packet communication control functional unit to the high speed downlink packet communication control functional unit, the number of the second transmission rate assignment channels through which the transmission rate is notified to the second mobile station, in the second transmission time period, and determining, at the high speed downlink packet communication control functional unit, a transmission power for a high speed downlink packet communication data channel, based on the number of the first transmission rate assignment channels and the number of the second transmission rate assignment channels.

A second aspect of the present invention is summarized as a mobile communication system in which a high speed uplink packet communication and a high speed downlink packet communication are performed between a radio base station and a mobile station. The radio base station includes a high speed uplink packet communication control functional unit and a high speed downlink packet communication control functional unit. The high speed uplink packet communication control functional unit is configured to notify, to a first mobile station through a first transmission rate assignment channel for the high speed uplink packet communication, a transmission rate for the high speed uplink packet communication in the first mobile station, in a first transmission time period. The high speed uplink packet communication control functional unit is configured to notify, to a second mobile station through a second transmission rate assignment channel for the high speed uplink packet communication, a transmission rate for the high speed uplink packet communication in the second mobile station, in a second transmission time period. The high speed uplink packet communication control functional unit is configured to notify, to a high speed downlink packet communication control functional unit, the number of the first transmission rate assignment channels through which the transmission rate is notified to the first mobile station, in the first transmission time period, and the high speed uplink packet communication control functional unit is configured to notify, to the high speed downlink packet communication control functional unit, the number of the second transmission rate assignment channels through which the transmission rate is notified to the second mobile station, in the second transmission time period. The high speed downlink packet communication control functional unit is configured to determine a transmission power for a high speed downlink packet communication data channel, based on the number of the first transmission rate assignment channels and the number of the second transmission rate assignment channels.

A third aspect of the present invention is summarized as a radio base station configured to perform, with a mobile station, a high speed uplink packet communication and a high speed downlink packet communication, including: a high speed uplink packet communication control functional unit and a high speed downlink packet communication control functional unit The high speed uplink packet communication control functional unit is configured to notify, to a first mobile station through a first transmission rate assignment channel for the high speed uplink packet communication, a transmission rate for the high speed uplink packet communication in the first mobile station, in a first transmission time period. The high speed uplink packet communication control functional unit is configured to notify, to a second mobile station through a second transmission rate assignment channel for the high speed uplink packet communication, a transmission rate for the high speed uplink packet communication in the second mobile station, in a second transmission time period. The high speed uplink packet communication control functional unit is configured to notify, to a high speed downlink packet communication control functional unit, the number of the is first transmission rate assignment channels through which the transmission rate is notified to the first mobile station, in the first transmission time period, and the high speed uplink packet communication control functional unit is configured to notify, to the high speed downlink packet communication control functional unit, the number of the second transmission rate assignment channels through which the transmission rate is notified to the second mobile station, in the second transmission time period. The high speed downlink packet communication control functional unit is configured to determine a transmission power for a high speed downlink packet communication data channel, based on the number of the first transmission rate assignment channels and the number of the second transmission rate assignment channels.

In the third aspect of the present invention, the high speed uplink packet communication control functional unit may be configured to determine the transmission power for the high speed downlink packet communication data channel, based on a transmission power in the first transmission rate assignment channel for the high speed uplink packet communication, and a transmission power in the second transmission rate assignment channel for the high speed uplink packet communication. The transmission power in the first transmission rate assignment channel may be calculated by use of a transmission power in a common pilot channel, a first offset, and the number of the first transmission rate assignment channels, and the transmission power in the second transmission rate assignment channel may be calculated by use of the transmission power in the common pilot channel, a second offset, and the number of the second transmission rate assignment channels.

In the third aspect of the present invention, the first offset and the second offset may be different from each other.

BRIEF DESCRIPTION OF THE DRAWINGS

FIG. 6 is a flowchart showing an operation of the radio base station according to the first embodiment of the present invention.

DESCRIPTION OF THE PREFERRED EMBODIMENTS (Configuration of the Mobile Communication System According to the First Embodiment of the Present Invention)

Figure 1:
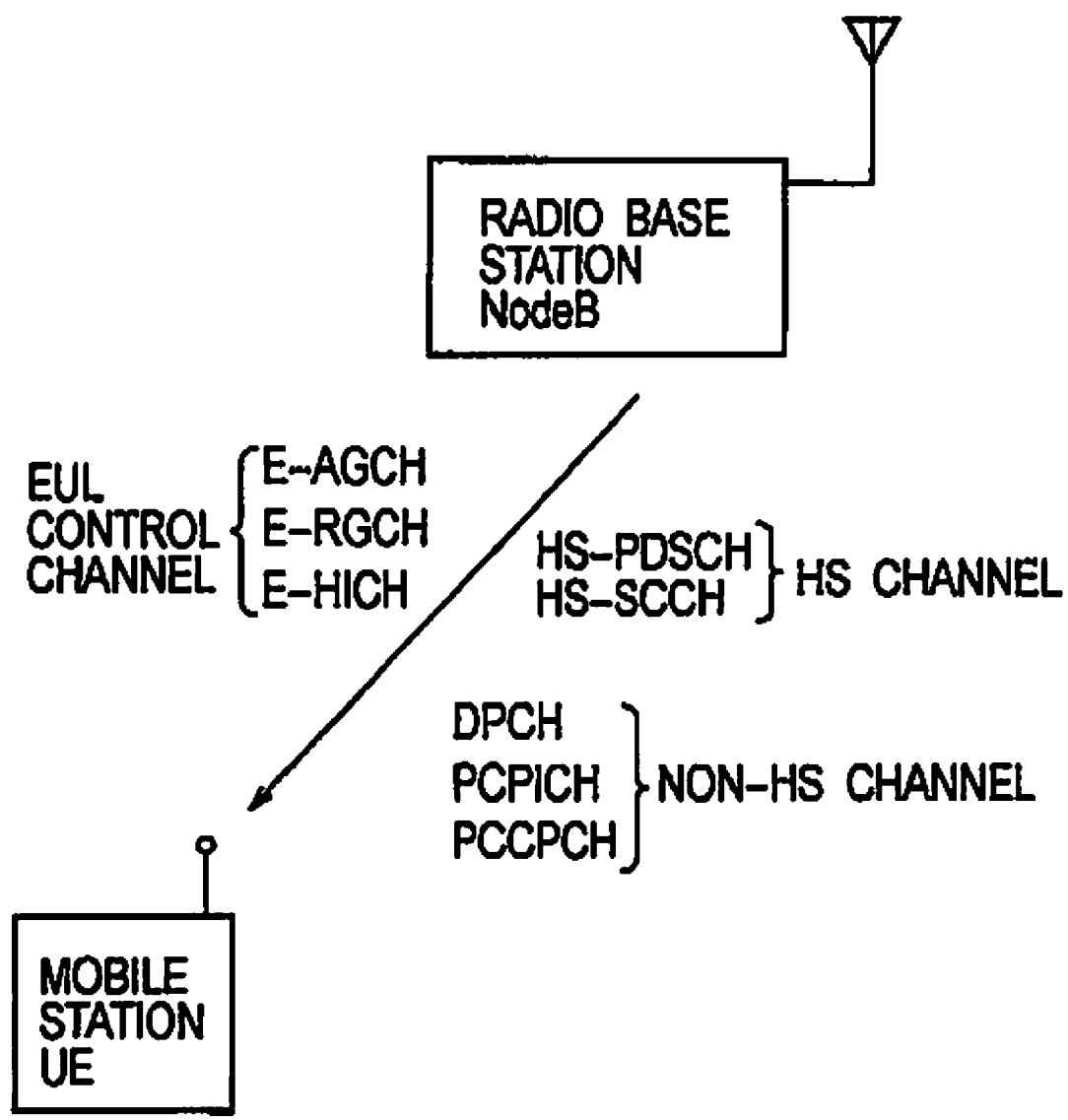
FIG. 1 is a diagram showing one example of the downlink channel used in a mobile communication system defined by the 3GPP.
Figure 2:
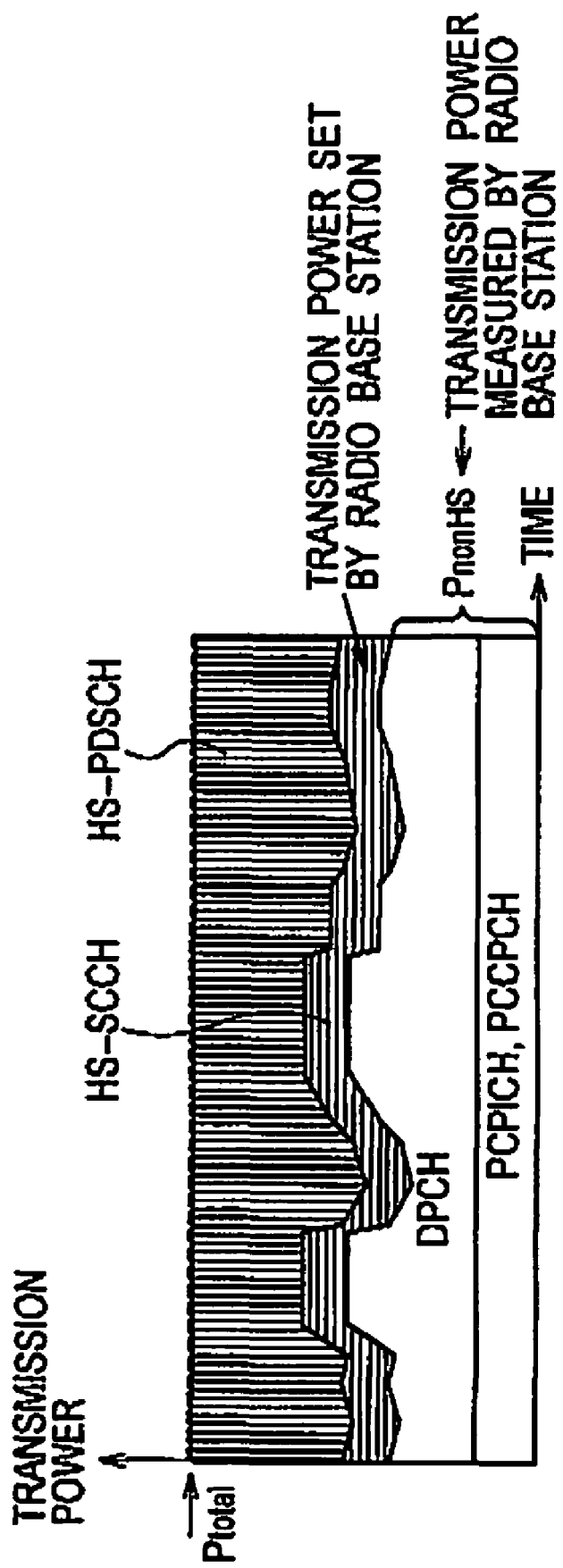
FIG. 2 is a diagram showing one example of the transmission power in a downlink channel assigned by a conventional radio base station.
Figure 3:
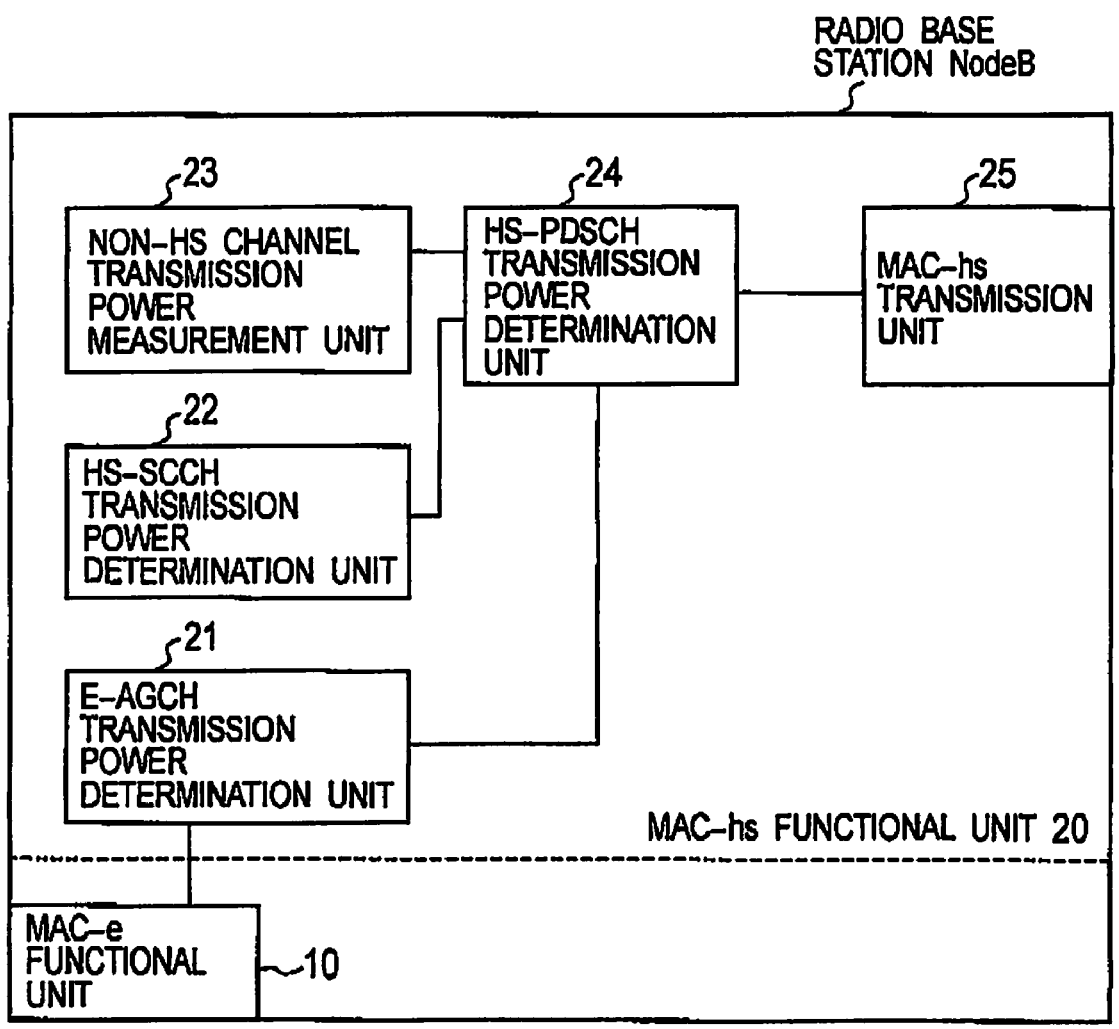
FIG. 3 is a functional block diagram of a radio base station according to a first embodiment of the present invention.
Figure 4:
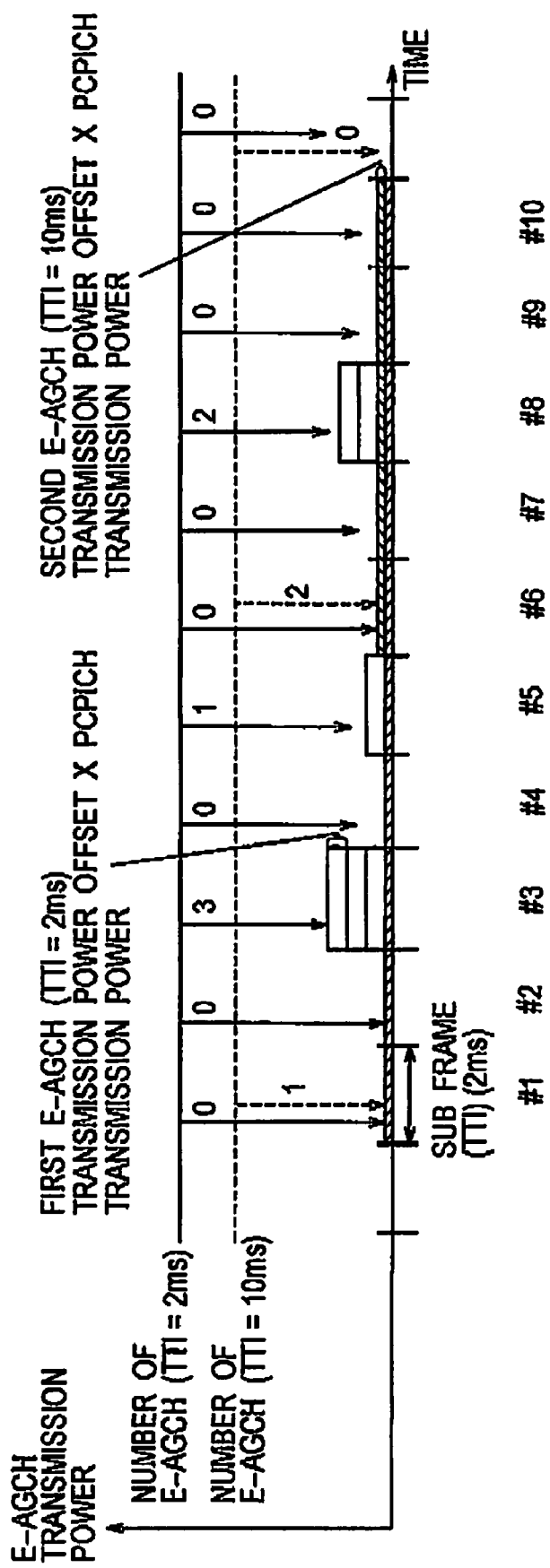
FIG. 4 is a diagram showing one example of notified contents which a MAC-e functional unit of the radio base station according to the first embodiment notifies a MAC-hs functional unit (E-AGCH transmission power determination unit) thereof.
Figure 5:
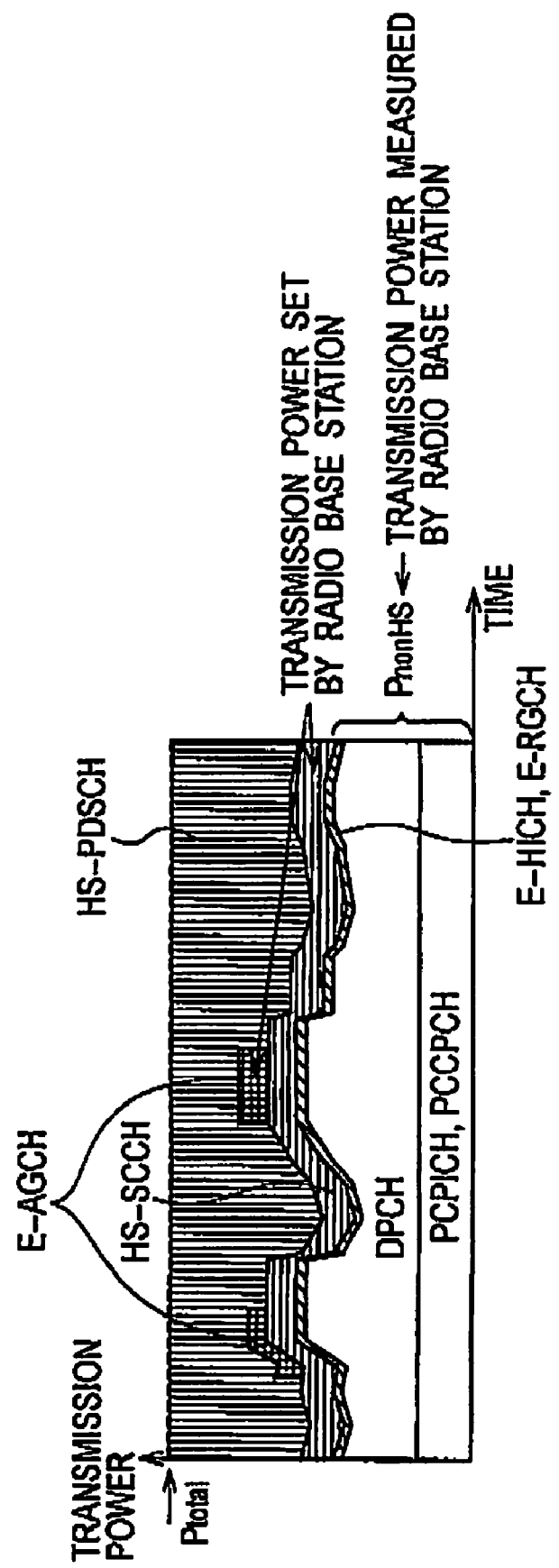
FIG. 5 is a view showing one example of the transmission power in a downlink channel assigned by the radio base station according to the first embodiment of the present invention.

Referring to FIGS. 3 to 5, the configuration of a mobile communication system according to a first embodiment of the present invention will be described.

In the present embodiment, a description will be given for a mobile communication system in which the EUL is applied as a high speed uplink packet communication, and the HSDPA is applied as a high speed downlink packet communication. However, the present invention is not limited to this example.

As shown in FIG. 3, a radio base station NodeB includes a MAC-e functional unit 10 configured to control the high speed uplink packet communication (EUL), and a MAC-hs functional unit 20 configured to control high speed downlink packet communication (HSDPA).

The MAC-e functional unit 10 is configured to notify, to a first mobile station UE through a first transmission rate assignment channel for the high speed uplink packet communication (a first E-AGCH), a transmission rate for the EUL (a transmission rate for the high speed uplink packet communication) in the first mobile station UE, at an interval of 2 ms (first transmission time period).

The MAC-e functional unit 10 is also configured to notify, to a second mobile station UE through a second transmission rate assignment channel for the high speed uplink packet communication (a second E-AGCH), a transmission rate for the EUL (a transmission rate for the high speed uplink packet communication) in the second mobile station UE, at an interval of 10 ms (second transmission time period).

More specifically, the MAC-e functional unit 10 is configured to transmit an absolute grant (AG), which is an index corresponding to the transmission rate for the EUL in the first and second mobile stations UE, through the first and second E-AGCHs, respectively.

Here, It is assumed that the sub-frame for the first mobile station UE is set to be 2 ms and the sub-frame for the second mobile station UE is set to be 10 ms.

In addition, the MAC-e functional unit 10 is configured to notify, to the MAC-hs functional unit 20, the number of the first E-AGCHs, in each sub-frames of 2 ms intervals. Moreover, the MAC-e functional unit 10 is configured to notify, to the MAC-hs functional unit 20, the number of the second E-AGCHs, in each sub-frames of 10 ms intervals.

In the example of FIG. 4, the MAC-e functional unit 10 notifies, to the MAC-hs functional unit 20, the number "0" of the first E-AGCHs and the number "1" of the second E-AGCHs, in sub-frame #1.

In addition, the MAC-e functional unit 10 notifies, to the MAC-hs functional unit 20, the number "0" of the first E-AGCHs in sub-frame #2, the number "3" of the first E-AGCHs in sub-frame #3, the number "0" of the first E-AGCHs in sub-frame #4, and the number "1" of the first E-AGCHs in sub-frame #5.

Furthermore, the MAC-e functional unit 10 notifies, to the MAC-hs functional unit 20, the number "0" of the first E-AGCHs and the number "2" of the second E-AGCHs in sub-frame #6.

In addition, the MAC-e functional unit 10 notifies, to the MAC-hs functional unit 20, the number "0" of the first E-AGCHs in sub-frame #7, the number "2" of the first E-AGCHs in sub-frame #8, the number "0" of the first E-AGCHs in sub-frame #9, and the number "0" of the first E-AGCHs in sub-frame #10.

The MAC-hs functional unit 20 includes an E-AGCH transmission power determination unit 21, an HS-SCCH transmission power determination unit 22, a non-HS channel transmission power measurement unit 23, an HS-PDSCH transmission power determination unit 24, and a MAC-hs transmitting unit 25.

The E-AGCH transmission power determination unit 21 is configured to determine a total transmission power for the E-AGCH in each sub-frames, based on the number of the first E-AGCHs and the number of the second E-AGCHs. Here, the respective number of the first E-AGCHs and the number of the second E-AGCHs are notified from the MAC-e functional unit 10 in advance.

Specifically, the E-AGCH transmission power determination unit 21 is configured to determine a total transmission power $P_{E\text{-}AGCH}$ for the E-AGCH by use of the following equation 5-1 or 5-2:

$$P_{E\_AGCH} = P_{PCPICH} \times \text{Offset \#1} \times N_{E\text{-}AGCH\#1} + P_{PCPICH} \times \text{Offset \#2} \times N_{E\text{-}AGCH\#2} \quad \text{(Equation 5-1)}$$

$$P_{E\text{-}AGCH} = (P_{PCPICH} + \text{Offset \#1}) \times N_{E\text{-}AGCH\#1} + (P_{PCPICH} + \text{Offset \#2}) \times N_{E\text{-}AGCH\#2} \quad \text{(Equation 5-2)}$$

where $P_{PCPICH}$ is the transmission power in a common pilot channel (common pilot channel). Offset #1 is a first offset (fixed value) for the transmission power in the PCPICH, Offset #2 is a second offset (fixed value) for the transmission power in the PCPICH, $N_{E\text{-}AGCH\#1}$ is the number of the first E-AGCHS, and $N_{E\text{-}AGCH\#2}$ is the number of the second E-AGCHs. Here, the respective number of the first E-AGCHs and the number of the second E-AGCHs are notified from the MAC-e functional unit 10.

In addition, the first offset (fixed value) and the second offset (fixed value) may be configured to be different from each other, or may be configured to be the same.

Here, the second E-AGCH is configured to repeatedly transmit the same information (AG) for five times at an interval of 2 ms, so that required transmission power can be kept lower than that of the first E-AGCH. Accordingly, the second offset may be set to be smaller than the first offset.

Note that, as shown in section 7.1 and 7.12 of 3GPP TS25.211, it is assumed that the transmission timing in the PCPICH (sub-frame for PCPICH) differs from the transmission timing in the first E-AGCH (sub-frame for E-AGCH) by 5120 chips.

As described above, the total transmission power for the E-AGCHS (the first E-AGCH and the second E-AGCH) is not determined based on the offset for the transmission power in the pilot channel of the dedicated physical control channel DPCCH. This is because the transmission power in the DPCCH changes in accordance with transmission power control (TPC). Accordingly, during the time when the MAC-e functional unit 10 notifies, to the E-AGCH transmission power determination unit 21, the numbers of the first E-AGCHs and the second E-AGCHs (this time is referred to as "delay time"), the transmission power in the DPCCH may change. As a result, the actual total transmission power in the E-AGCH differs from the total transmission power in the E-AGCH expected by the MAC-e functional unit 10.

Accordingly, in the present embodiment, the E-AGCH transmission power determination unit 21 is configured to determine the total transmission power for the E-AGCH by use of the offset for the transmission power in the PCPICH, which is a fixed value.

The HS-SCCH transmission power determination unit 22 is configured to determine the transmission power for the HS-SCCH.

The non-HS channel transmission power measurement unit 23 is configured to measure the transmission power in the non-HS channel. Here, the non-HS channel includes the PCPICH, the PCCPCH, the E-RGCH, the E-HICH, or the like.

As shown in FIG. 5, the HS-PDSCH transmission power determination unit 24 is configured to determine the transmission power for the HS-PDSCH, based on the total transmission power in the E-AGCH, the transmission power in the HS-SCCH, and the transmission power in the non-HS channel. Here, as described above, the total transmission power for the E-AGCH is determined by the E-AGCH transmission power determination unit 21. The transmission power for the HS-SCCH is determined by the HS-SCCH transmission power determination unit 22, and the transmission power for the non-HS channel is measured by the non-HS channel transmission power measurement unit 23.

In other words, the HS-PDSCH transmission power determination unit 24 is configured to determine the transmission power $P_{HSPCSCH}$ for the HS-PDSCH, based on: the transmission power $P_{E\text{-}AGCH\#1}$ in the first E-AGCH which is calculated by using the transmission power $P_{PCPICH}$ in the common pilot channel (PCPICH), the first offset Offset#1, and the number of the first E-AGCHs $N_{E\text{-}AGCH\#1}$; and the transmission power $P_{E\text{-}AGCH\#2}$ for the second E-AGCH which is calculated by using the transmission power $P_{PCPICH}$ in the PCPICH, the second offset Offset#2, and the number of the second E-AGCHs $N_{E\text{-}AGCH\#2}$.

Specifically, the HS-PDSCH transmission power determination unit 24 is configured to determine the transmission power $P_{HSPCSCH}$ for the HS-PDSCH in each sub-frame by use of the following equation 6:

$$P_{HSPDSCH} = P_{total} - P_{nonHS} - P_{margin} - P_{E\text{-}AGCH} - N_{HSSCCH} \times P_{HSSCCH} \quad \text{(Equation 6)}.$$

The MAC-hs transmitting unit 25 is configured to transmit the MAC-hs PDU through the HS-PDSCH by use of the transmission power determined by the HS-PDSCH transmission power determination unit 24.

(Operation of the Mobile Communication System According to the First Embodiment of the Present Invention)

Referring to FIG. 6, the operation of the mobile communication system according to the first embodiment of me present invention will be described.

As shown in FIG. 6, in stop S101, the MAC-hs functional unit 20 of the radio base station NodeB measures the transmission power in the non-HS channel (such as PCPICH, PCCPCH, E-RGCH, or E-HICH).

In step S102, the MAC-hs functional unit 20 of the radio base station NodeB determines the transmission power for the HS-SCCH.

In step S103, the MAC-hs functional unit 20 of the radio base station NodeB acquires, from the MAC-e functional unit 10, the respective numbers of the first E-AGCHs and the second E-AGCHs in each sub-frames.

In step S104, the MAC-hs functional unit 20 determines the total transmission power for the E-AGCH, by use of the acquired numbers of the first E-AGCHs and the second E-AGCHs.

In step S105, the MAC-hs functional unit 20 of the radio base station NodeB calculates the transmission power that can be assigned to the HS-PDSCH, based on the transmission power in the non-HS channel (measured in step S101); the transmission power in the HS-SCCH (determined in stop S102); and the total transmission power in the E-AGCH (determined in step S103).

In step S108, the MAC-hs functional unit 20 of the radio base station NodeB determines the transmission power for the HS-PDSCH in a range of the transmission power calculated in step S105.

In step S107, the MAC-hs functional unit 20 transmits the MAC-hs PDU through the HS-PDSCH, by use of the determined transmission power.

(Advantages and Effects of the Mobile Communication System According to the First Embodiment of the Present Invention)

According to the mobile communication system of the present embodiment, the MAC-hs functional unit 20 of the radio base station NodeB is configured to determine the transmission power for the E-AGCH, by use the offset (fixed value) from the transmission power in the PCPICH. Here, the transmission power in the PCPICH is the fixed power because the TPC control is not performed therein. Thus, when compared with the case where the offset from the transmission power in the DPCCH, the transmission power in the DPCCH being a variable power because the TPC control is performed therein, difference between the transmission power in the E-AGCH estimated by the MAC-e functional unit 10 and the actual transmission power in the E-AGCH can be kept low.

In addition, the transmission power for the E-AGCH is determined by use of the multiplication result of the number of E-AGCHs noting AG in each sub-frame, which is determined by the MAC-E functional unit 10, and the above-described offset (offset #1 and offset #2). Accordingly, when compared with the case where the actual transmission power in the E-AGCH is measured, an influence of the delay time can be eliminated. Thus, it is possible to eliminate the difference between the transmission power in the E-AGCH estimated by the MAC-e functional unit 10 and the actual transmission power in the E-AGCH, while preventing the radio resource from being wasted.

Note that the operations of the mobile station UE and radio base station NodeB described above may be implemented by hardware, by a software module executed by a processor, or by a combination of both.

The software module may be provided in any form of storage medium such as a random access memory (RAM), a flash memory, a read only memory (ROM), an erasable programmable ROM (EPROM), an electronically erasable and programmable ROM (EPSOM), a register, a hard disk, a removable disk and a CD-ROM.

Such a storage medium is connected to the processor so that the processor can read and write information from and into the storage medium. Moreover, the storage medium may be integrated in the processor. Furthermore, the storage medium and the processor may be provided in an ASIC. The ASIC may be provided in a mobile station UE and a radio base station eNodeB. Moreover, the storage medium and the processor may be provided as discrete components in the mobile station UE and the radio base station eNodeB.

Hereinabove, the present invention has been described in detail by use of the embodiment. However, it is obvious to those skilled in the art that the present invention is not limited to the embodiment described herein. The present invention may be implemented as a modification and a variation, within the spirit and scope of the present invention defined by the scope of claims. Accordingly, the present specification aims to provide an exemplar description and does not limit the present invention in any way.

What is claimed is:

1. A mobile communication method in which a high speed uplink packet communication and a high speed downlink packet communication are performed between a radio base station and a mobile station, comprising:
  notifying, from a high speed uplink packet communication control functional unit to a first mobile station through a first transmission rate assignment channel for the high speed uplink packet communication, a transmission rate for the high speed uplink packet communication in the first mobile station, in a first transmission time period;
  notifying, from the high speed uplink packet communication control functional unit to a second mobile station through a second transmission rate assignment channel for the high speed uplink packet communication, a transmission rate for the high speed uplink packet communication in the second mobile station, in a second transmission time period;
  notifying, from the high speed uplink packet communication control functional unit to a high speed downlink packet communication control functional unit, the number of the first transmission rate assignment channels through which the transmission rate is notified to the first mobile station, in the first transmission time period;
  notifying, from the high speed uplink packet communication control functional unit to the high speed downlink packet communication control functional unit, the number of the second transmission rate assignment channels through which the transmission rate is notified to the second mobile station, in the second transmission time period, and
  determining, at the high speed downlink packet communication control functional unit, a transmission power for a high speed downlink packet communication data channel, based on the number of the first transmission rate assignment channels and the number of the second transmission rate assignment channels.

2. A mobile communication system in which a high speed uplink packet communication and a high speed downlink packet communication are performed between a radio base station and a mobile station, wherein
  the radio base station comprises a high speed uplink packet communication control functional unit and a high speed downlink packet communication control functional unit,
  the high speed uplink packet communication control functional unit is configured to notify, to a first mobile station through a first transmission rate assignment channel for the high speed uplink packet communication, a transmission rate for the high speed uplink packet communication in the first mobile station, in a first transmission time period,
  the high speed uplink packet communication control functional unit is configured to notify, to a second mobile station through a second transmission rate assignment channel for the high speed uplink packet communication, a transmission rate for the high speed uplink packet communication in the second mobile station, in a second transmission time period,
  the high speed uplink packet communication control functional unit is configured to notify, to a high speed downlink packet communication control functional unit, the number of the first transmission rate assignment channels through which the transmission rate is notified to the first mobile station, in the first transmission time period,
  the high speed uplink packet communication control functional unit is configured to notify, to the high speed downlink packet communication control functional unit, the number of the second transmission rate assignment channels through which the transmission rate is notified to the second mobile station, in the second transmission time period, and
  the high speed downlink packet communication control functional unit is configured to determine a transmission power for a high speed downlink packet communication data channel, based on the number of the first transmission rate assignment channels and the number of the second transmission rate assignment channels.

3. A radio base station configured to perform, with a mobile station, a high speed uplink packet communication and a high speed downlink packet communication, comprising:
  a high speed uplink packet communication control functional unit and a high speed downlink packet communication control functional unit, wherein
  the high speed uplink packet communication control functional unit is configured to notify, to a first mobile station through a first transmission rate assignment channel for the high speed uplink packet communication, a transmission rate for the high speed uplink packet communication in the first mobile station, in a first transmission time period,
  the high speed uplink packet communication control functional unit is configured to notify, to a second mobile station through a second transmission rate assignment channel for the high speed uplink packet communication, a transmission rate for the high speed uplink packet communication in the second mobile station, in a second transmission time period,
  the high speed uplink packet communication control functional unit is configured to notify, to a high speed downlink packet communication control functional unit, the number of the first transmission rate assignment channels through which the transmission rate is notified to the first mobile station, in the first transmission time period,
  the high speed uplink packet communication control functional unit is configured to notify, to the high speed downlink packet communication control functional unit the number of the second transmission rate assignment channels through which the transmission rate is notified to the second mobile station, in the second transmission time period, and
  the high speed downlink packet communication control functional unit is configured to determine a transmission power for a high speed downlink packet communication data channel, based on the number of the first transmission rate assignment channels and the number of the second transmission rate assignment channels.

4. The radio base station according to claim 3, wherein the high speed uplink packet communication control functional unit is configured to determine the transmission power for the high speed downlink packet communication data channel, based on a transmission power in the first transmission rate assignment channel for the high speed uplink packet communication, and a transmission power in the second transmission rate assignment channel for the high speed uplink packet communication, the transmission power in the first transmission rate assignment channel is calculated by use of a transmission power in a common pilot channel, a first offset, and the number of the first transmission rate assignment channels, and the transmission power in the second transmission rate assignment channel is calculated by use of the transmission power in the common pilot channel, a second offset, and the number of the second transmission rate assignment channels.

5. The radio base station according to claim 4, wherein the first offset and the second offset are different from each other.

* * * * *